(12) United States Patent
Gross et al.

(10) Patent No.: US 8,155,332 B2
(45) Date of Patent: Apr. 10, 2012

(54) METHOD AND APPARATUS FOR ATTENUATING FAN NOISE THROUGH TURBULENCE MITIGATION

(75) Inventors: Kenneth C. Gross, San Diego, CA (US); Aleksey M. Urmanov, San Diego, CA (US); Charles E. Kinney, La Jolla, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1127 days.

(21) Appl. No.: 11/972,043

(22) Filed: Jan. 10, 2008

(65) Prior Publication Data

US 2009/0180635 A1 Jul. 16, 2009

(51) Int. Cl.
*G10K 11/16* (2006.01)
*F01N 1/06* (2006.01)
*F01N 1/00* (2006.01)

(52) U.S. Cl. ...... 381/71.1; 381/71.5; 181/206; 361/690; 361/695

(58) Field of Classification Search ............... 381/71.1, 381/71.2, 71.3, 71.5; 181/206, 220, 225, 181/226; 361/690, 691, 694, 695
See application file for complete search history.

(56) References Cited

U.S. PATENT DOCUMENTS

| | | | | | |
|---|---|---|---|---|---|
| 2,043,416 | A | * | 6/1936 | Lueg | 381/71.1 |
| 3,261,576 | A | * | 7/1966 | Valyi | 244/130 |
| 3,815,356 | A | * | 6/1974 | Burge et al. | 60/204 |
| 4,398,667 | A | * | 8/1983 | Maestrello | 239/265.17 |
| 4,829,813 | A | * | 5/1989 | Syed | 73/112.01 |
| 5,010,576 | A | * | 4/1991 | Hill | 381/71.9 |
| 5,222,698 | A | * | 6/1993 | Nelson et al. | 244/203 |
| 5,325,438 | A | * | 6/1994 | Browning et al. | 381/71.7 |
| 5,377,275 | A | * | 12/1994 | Suzuki | 381/71.5 |
| 5,448,645 | A | * | 9/1995 | Guerci | 381/71.14 |
| 5,511,127 | A | * | 4/1996 | Warnaka | 381/71.5 |
| 5,602,926 | A | * | 2/1997 | Ohashi et al. | 381/71.5 |
| 5,636,287 | A | * | 6/1997 | Kubli et al. | 381/71.2 |
| 5,662,136 | A | * | 9/1997 | Drzewiecki et al. | 137/14 |
| 5,692,054 | A | * | 11/1997 | Parrella et al. | 381/71.3 |
| 5,721,402 | A | * | 2/1998 | Parente | 181/214 |
| 5,789,678 | A | * | 8/1998 | Pla | 73/660 |
| 5,828,768 | A | * | 10/1998 | Eatwell et al. | 381/333 |
| 5,995,632 | A | * | 11/1999 | Okada | 381/71.3 |
| 6,160,892 | A | * | 12/2000 | Ver | 381/71.5 |
| 6,188,770 | B1 | * | 2/2001 | Okada | 381/71.3 |
| 7,282,873 | B2 | * | 10/2007 | Abali et al. | 318/41 |
| 7,353,908 | B1 | * | 4/2008 | French | 181/206 |
| 7,695,553 | B2 | * | 4/2010 | Celik et al. | 96/130 |
| 7,762,373 | B2 | * | 7/2010 | Bolton et al. | 181/225 |
| 7,766,996 | B2 | * | 8/2010 | Celik et al. | 95/96 |
| 7,894,613 | B1 | * | 2/2011 | Ong et al. | 381/71.3 |
| 7,992,674 | B2 | * | 8/2011 | Gorny et al. | 181/225 |
| 2001/0021258 | A1 | * | 9/2001 | Nagel | 381/71.4 |

(Continued)

*Primary Examiner* — Edgardo San Martin
(74) *Attorney, Agent, or Firm* — Park, Vaughan, Fleming & Dowler LLP; Chia-Hsin Suen

(57) ABSTRACT

Some embodiments of the present invention provide a system that attenuates noise from a fan exhaust of a computer system. During operation, the system monitors the noise from the fan exhaust and calculates a frequency spectrum of the noise from the monitored noise. Next, the system generates an antiphase spectrum from the frequency spectrum and generates a flow of air which exhibits a property of the antiphase spectrum. Finally, the system directs the flow of air into the fan exhaust so that the noise is attenuated by a reduction of turbulence in the fan exhaust by the flow of air.

20 Claims, 2 Drawing Sheets

U.S. PATENT DOCUMENTS

| | | |
|---|---|---|
| 2004/0086137 A1* | 5/2004 | Yu et al. ............... 381/71.11 |
| 2005/0254663 A1* | 11/2005 | Raptopoulos et al. ....... 381/71.1 |
| 2007/0230712 A1* | 10/2007 | Belt et al. ............... 381/71.1 |
| 2008/0187147 A1* | 8/2008 | Berner et al. ............. 381/71.3 |
| 2009/0206842 A1* | 8/2009 | Vaidyanathan et al. ...... 324/537 |
| 2009/0259347 A1* | 10/2009 | Gross et al. ................ 700/299 |
| 2009/0271049 A1* | 10/2009 | Kinney et al. .............. 700/300 |
| 2009/0308685 A1* | 12/2009 | Gorny et al. ............... 181/205 |
| 2010/0024555 A1* | 2/2010 | Gross et al. ................. 73/579 |
| 2010/0028134 A1* | 2/2010 | Slapak et al. ............... 415/119 |

* cited by examiner

METHOD AND APPARATUS FOR ATTENUATING FAN NOISE THROUGH TURBULENCE MITIGATION

BACKGROUND

1. Field

The present invention relates to a method and apparatus for attenuating noise from a fan exhaust of a computer system. More specifically, the present invention relates to a method and apparatus for attenuating fan noise through turbulence mitigation.

2. Related Art

As predicted by Moore's Law, integrated circuit (IC) performance continues to increase at an exponential rate. However, these performance improvements have given rise to problems with power consumption and heat dissipation. This has created a demand for innovative cooling systems that can dissipate the large amounts of heat generated by modern ICs. The resulting improvements in cooling technology have allowed such cooling systems to keep up with ICs, albeit at an added cost and with a number of undesirable consequences.

In particular, the fans used to cool high-performance computer systems, such as servers, mainframes, and supercomputers, have become larger, more numerous, and more powerful to compensate for the increased heat generated by the machines' hardware components. In turn, the fans themselves produce more acoustic noise than previous generations of fans. As a result, a data center that is densely packed with high-performance machines may generate enough noise to create problems for humans in the data center. For example, service engineers may have difficulty communicating with one another in the data center and may also have difficulty concentrating on configuring and/or troubleshooting the machines. Such distractions due to increased fan noise may also cause no trouble found (NTF) issues, resulting in reduced profit margins, increased costs, and eroded brand value. Thus, mitigating fan noise can help to prevent errors and increase performance while servicing such computer systems.

SUMMARY

Some embodiments of the present invention provide a system that attenuates noise from a fan exhaust of a computer system. During operation, the system monitors the noise from the fan exhaust and calculates a frequency spectrum of the noise from the monitored noise. Next, the system generates an antiphase spectrum from the frequency spectrum and generates a flow of air which exhibits a property of the antiphase spectrum. Finally, the system directs the flow of air into the fan exhaust so that the noise is attenuated by a reduction of turbulence in the fan exhaust by the flow of air.

In some embodiments, the system also includes multiple nozzles arranged circumferentially around the fan exhaust, which direct the flow of compressed air into the fan exhaust.

In some embodiments, each of the nozzles exhibits a different frequency of the antiphase spectrum.

In some embodiments, the nozzles are used to counteract asymmetrical turbulence patterns in the fan exhaust.

In some embodiments, each of the nozzles is associated with a control actuator.

In some embodiments, the frequency spectrum is produced using a Fast Fourier Transform (FFT).

In some embodiments, the antiphase spectrum is generated using a service processor of the computer system.

In some embodiments, the noise is monitored using a microelectromechanical systems (MEMS) acoustic sensor.

In some embodiments, the flow of compressed air is directed into the fan exhaust downstream from the MEMS acoustic sensor.

In some embodiments, the property of the antiphase spectrum is at least one of an amplitude, a phase, and a frequency.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Embodiments of the invention provide a method and apparatus for attenuating noise. Specifically, embodiments of the invention provide a method and apparatus to attenuate noise from a fan exhaust of a computer system through turbulence mitigation. In one or more embodiments of the invention, a virtual Herschel-Quincke (HQ) tube is implemented using a microelectromechanical (MEMS) sensor, service processor, nozzle, control actuator, and air compressor within the computer system.

The noise may be sampled and/or monitored by the MEMS sensor, which is located in the fan exhaust. The service processor then obtains a frequency spectrum of the noise from the sampled noise using a Fast Fourier Transform (FFT) and generates an antiphase spectrum from the frequency spectrum. A flow of air exhibiting one or more properties of the antiphase spectrum is then directed into the fan exhaust using the nozzle, control actuator, and air compressor. The mixing of the fan exhaust with the flow of air causes a reduction of turbulence in the fan exhaust and thereby attenuates the noise. In one or more embodiments of the invention, attenuating the fan noise reduces the level of distraction caused by the noise, allowing users, administrators, and/or service engineers to interact with the computer system with greater efficiency and accuracy.

Figure 1:
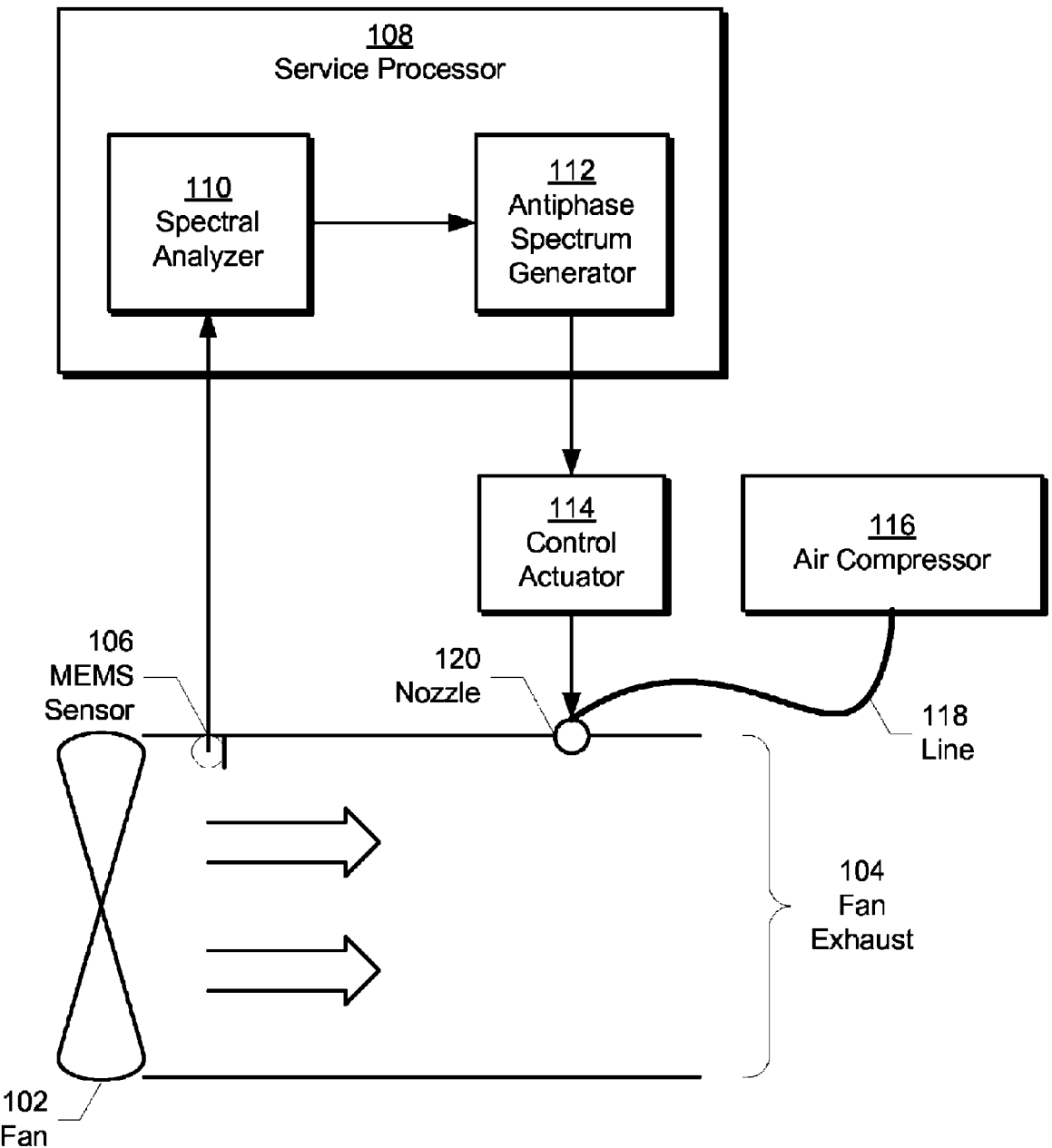
FIG. 1 shows a schematic diagram of a virtual Herschel-Quincke (HQ) tube implementation in accordance with an embodiment of the present invention.

FIG. 1 shows a schematic diagram of a system in accordance with an embodiment of the present invention. Specifically, FIG. 1 shows a schematic diagram of a virtual Herschel-Quincke (HQ) tube implementation in accordance with an embodiment of the present invention. In one or more embodiments of the invention, the system of FIG. 1 is used to reduce turbulence generated by a fan 102 and carried down a fan exhaust 104 of the fan. In addition, fan 102 may be used to cool one or more components of a computer system, such as a mainframe computer, server, supercomputer, and/or personal computer. More specifically, the system of FIG. 1 includes a microelectromechanical systems (MEMS) sensor 106, a service processor 108, a control actuator 114, an air compressor 116, a nozzle 120, and a line 118. Each of the components is described in further detail below.

MEMS sensor 106 is used to monitor and/or sample the noise generated by fan 102. In one or more embodiments of the invention, MEMS sensor 106 corresponds to a MEMS acoustic sensor. In addition, other types of acoustic sensors, such as microphones, may be used to monitor and/or sample the noise. As shown in FIG. 1, MEMS sensor 106 is placed downstream from fan 102 in fan exhaust 104. Additionally, MEMS sensor 106 is placed in the vicinity of fan 102 to facilitate the monitoring of noise directly from fan 102. The monitored noise is transmitted to a spectral analyzer 110 in service processor 108, which calculates a frequency spectrum of the noise from the monitored noise. In one or more embodiments of the invention, code which implements spectral analyzer 110 is stored in service processor 108 and/or is executed by service processor 108.

In one or more embodiments of the invention, spectral analyzer 110 uses a Fast Fourier Transform (FFT) to generate the frequency spectrum from the sampled noise. The frequency spectrum is then used by antiphase spectrum generator 112 to generate an antiphase spectrum from the frequency spectrum. As with spectral analyzer 110, code associated with antiphase spectrum generator 112 may be stored in and/or executed by service processor 108. In addition, other processors on the computer system may be used to execute spectral analyzer 110 and/or antiphase spectrum generator 112. Antiphase spectrum generator 112 may also apply a filter, such as a band-pass filter, to the antiphase spectrum to remove extraneous frequencies from the antiphase spectrum. In one embodiment of the present invention, extraneous frequencies correspond to frequencies found outside the audible range of the human ear.

Those skilled in the art will appreciate that the antiphase spectrum is of opposite phase to the frequency spectrum. As a result, a sound wave with the antiphase spectrum destructively interferes with the sound wave produced by the fan noise and attenuates the fan noise. In addition, if the sound wave has identical amplitude to the fan noise, a complete cancellation of the noise by the sound wave occurs.

To attenuate the fan noise, a flow of air is produced by air compressor 116. This flow of air is directed to nozzle 120 using line 118 and released from nozzle 120 by control actuator 114 such that the flow of air exhibits one or more properties of the antiphase spectrum. In one or more embodiments of the invention, the properties of the antiphase spectrum include one or more frequencies, one or more amplitudes, and a phase. When a flow of air that exhibits the phase and at least one frequency of the antiphase spectrum is directed into fan exhaust 104 by nozzle 120, turbulence levels in fan exhaust 104 are reduced, resulting in a phase cancellation between the fan noise and the flow of air. In other words, the flow of air simulates an HQ tube that is designed to phase shift the fan noise to create a noise cancellation wave. Specifically, the phase cancellation occurs in the frequencies of the antiphase spectrum exhibited by the flow of air; because the same frequencies are found in the noise at an opposite phase (i.e., with a 180-degree difference), the frequencies interfere destructively and cancel each other out, thereby reducing the fan noise at the frequencies. Furthermore, the antiphase spectrum may be calculated to account for changes to the frequency spectrum between the measurement point at MEMS sensor 106 and nozzle 120. Consequently, the antiphase spectrum may be of opposite phase to the frequency spectrum at nozzle 120, rather than the frequency spectrum measured by MEMS sensor 106.

As shown in FIG. 1, nozzle 120 is located downstream in fan exhaust 104 from MEMS sensor 106, allowing the flow of air generated by control actuator 114 and air compressor 116 to counteract the noise sampled upstream by MEMS sensor 106 before the noise is transmitted outside the computer system. The location of nozzle 120 downstream from MEMS sensor 106 may also allow MEMS sensor 106 to monitor the unattenuated fan noise with greater accuracy, since any noise attenuation from nozzle 120 is unlikely to travel upstream to MEMS sensor 106.

Further, while only one nozzle, one control actuator, and one line are shown in FIG. 1, other embodiments of the invention may include multiple nozzles, control actuators, and lines. In addition, the nozzles may be arranged circumferentially around fan exhaust 104, as found in typical HQ tube configurations. Furthermore, each nozzle may be controlled by a corresponding control actuator such that the resulting flow of air exhibits a different frequency of the antiphase spectrum, thus providing more comprehensive and/or effective mitigation of turbulence and noise. For example, a noise attenuation system with five nozzles arranged around fan exhaust 104 may generate five flows of air from the five nozzles. The five flows may exhibit the five most-prominent frequencies of the antiphase spectrum in the audible range of the human ear. Alternatively, the five flows may exhibit five frequencies of the antiphase spectrum based on human sensitivity to the frequencies of the antiphase spectrum.

In one or more embodiments of the invention, multiple nozzles arranged around fan exhaust 104 may be used in the presence of asymmetrical turbulence patterns in fan exhaust 104. Multiple MEMS sensors may also be arranged around fan exhaust 104 near fan 102 to determine the asymmetrical turbulence patterns. The control actuators may then release air from the nozzles to counteract the frequencies found in the asymmetrical turbulence patterns at relevant nozzle positions in fan exhaust 104.

Those skilled in the art will appreciate that the nozzle(s) may be arranged in various ways along fan exhaust 104. Specifically, the nozzles may be arranged along a line, a circle, a spiral, a checkerboard pattern, or any other configuration to attenuate noise in fan exhaust 104. Those skilled in the art will also appreciate that the nozzles may also be controlled to release air in various configurations to optimally attenuate noise from fan 102. For example, multiple nozzles may produce air flows of the same frequency to increase attenuation of the frequency in the noise. Similarly, air flow from one nozzle may exhibit multiple frequencies of the antiphase spectrum and cause attenuation of the same frequencies in the fan noise.

In one or more embodiments of the invention, the noise is repeatedly monitored and/or sampled from fan 102 at a rate that allows the virtual HQ tube system to adapt to changes in fan speed and resulting frequency variations found in the fan noise. In addition, the use of nozzles, control actuators, and small diameter lines from the air compressor minimizes the size and mechanical complexity of the virtual HQ tube system, thereby allowing such a system to be easily installed, diagnosed, and serviced in a computer system with severe space constraints. The resulting reduction in turbulence and attenuation of fan noise may also enable users, administrators, service engineers, and/or other humans in the vicinity of the noise to function and communicate with one another more effectively.

Figure 2:
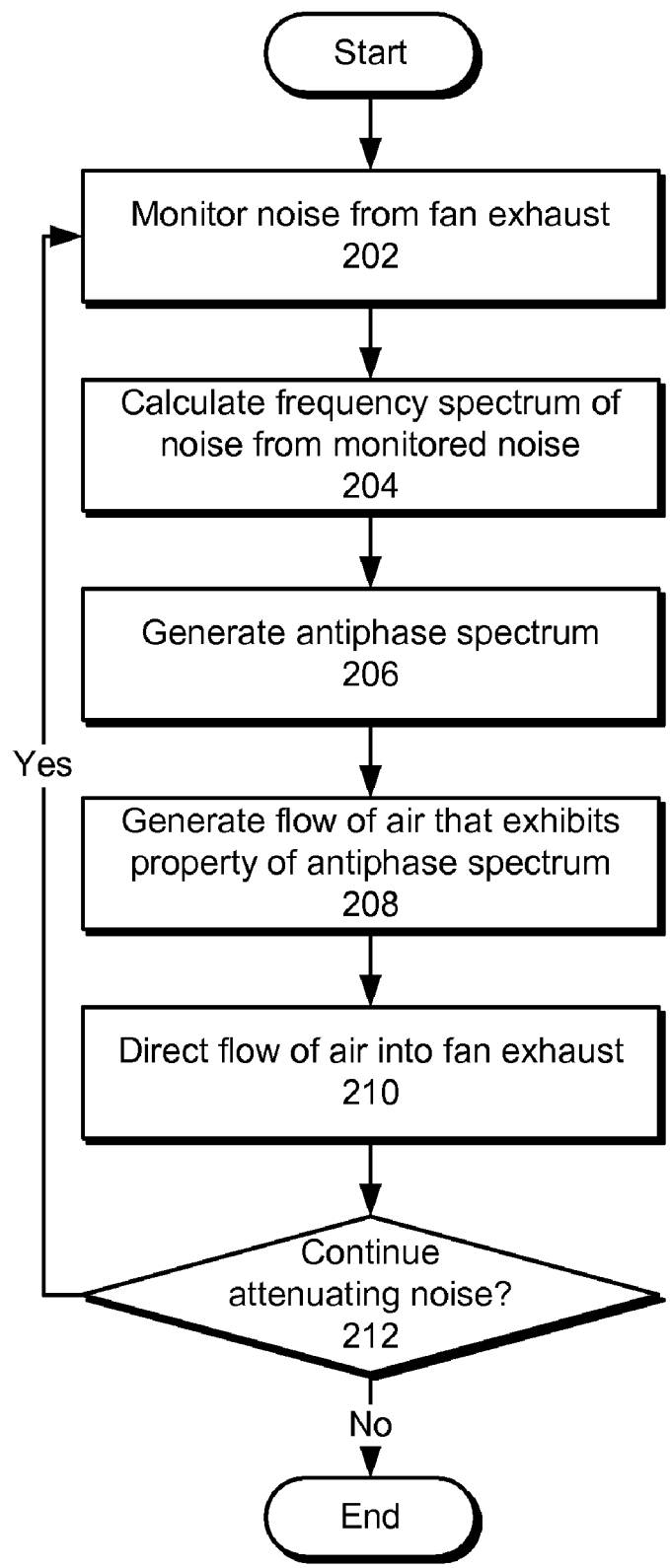
FIG. 2 shows a flow diagram of turbulence mitigation from a fan exhaust of a computer system in accordance with an embodiment of the present invention.

FIG. 2 shows a flow diagram of turbulence mitigation from a fan exhaust of a computer system in accordance with an embodiment of the present invention. In one or more embodiments of the invention, one or more of the steps may be omitted, repeated, and/or performed in a different order. Accordingly, the specific arrangement of steps shown in FIG. 2 should not be construed as limiting the scope of the invention.

Initially, noise is monitored from the fan exhaust (operation 202). As mentioned above, the noise may be monitored by a MEMS acoustic sensor placed near the fan in the fan exhaust. Alternatively, the noise may be monitored using other types of acoustic sensors, such as microphones. Next, a frequency spectrum for the noise is calculated from the monitored noise (operation 204). Specifically, a service processor and/or other type of processor may be used to perform the frequency-spectrum calculations. In addition, the service processor may execute code which implements a spectral analyzer to calculate the frequency spectrum.

Next, an antiphase spectrum is generated from the frequency spectrum (operation 206). As described above, the antiphase spectrum is of opposite phase to the frequency spectrum and may be band-pass filtered to include only audible frequencies. Moreover, the antiphase spectrum may be calculated to account for changes in the frequency spectrum as the noise is transmitted along the fan exhaust. The antiphase spectrum may be generated using the service processor and/or other processor using code associated with an antiphase spectrum generator.

A flow of air that exhibits one or more properties of the antiphase spectrum is then generated (operation 208). The properties may include frequencies, amplitudes, and phases of the antiphase spectrum. The flow of air may be generated using an air compressor and modulated using one or more control actuators and one or more nozzles to exhibit the properties of the antiphase spectrum. The nozzle(s) may also be positioned to direct the flow of air into the fan exhaust (operation 210), which reduces turbulence in the fan exhaust and further results in attenuation of the noise. As mentioned previously, each control actuator and nozzle may exhibit a different frequency of the antiphase spectrum. On the other hand, a single control actuator and nozzle may produce air flow that contains multiple frequencies of the antiphase spectrum. In addition, multiple control actuators and nozzles may be used to counteract asymmetrical turbulence patterns in the fan exhaust.

The noise may continue to be attenuated (operation 212) as long as the fan is running. To do so, the noise is continuously monitored and a frequency spectrum is calculated from the noise. Then, an antiphase spectrum is generated from the frequency spectrum, and a flow of air that carries one or more properties of the antiphase spectrum is generated and directed into the fan exhaust (operations 202-210). Because the noise is continuously monitored and the frequency spectrum, antiphase spectrum, and flow of air are updated accordingly, noise from the fan may be attenuated regardless of the fan's speed.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for attenuating noise from a fan exhaust of a computer system, comprising:
    monitoring the noise from the fan exhaust;
    calculating a frequency spectrum of the noise from the monitored noise;
    generating an antiphase spectrum from the frequency spectrum;
    generating a flow of air that exhibits a property of the antiphase spectrum; and
    directing the flow into the fan exhaust; and
    attenuating the noise by using the flow of air to reduce turbulence in the fan exhaust.

2. The method of claim 1, wherein the flow of air is directed into the fan exhaust using multiple nozzles arranged circumferentially around the fan exhaust.

3. The method of claim 2, wherein each of the nozzles exhibits a different frequency of the antiphase spectrum.

4. The method of claim 2, wherein the nozzles are used to counteract asymmetrical turbulence patterns in the fan exhaust.

5. The method of claim 1, wherein the antiphase spectrum is generated using a service processor of the computer system.

6. The method of claim 1, wherein the frequency spectrum is produced using a Fast Fourier Transform (FFT).

7. The method of claim 1, wherein the flow of air is produced using an air compressor and a control actuator.

8. The method of claim 1, wherein the noise is monitored using a microelectromechanical systems (MEMS) acoustic sensor.

9. The method of claim 8, wherein the flow of air is directed into the fan exhaust downstream from the MEMS acoustic sensor.

10. The method of claim 1, wherein the property of the antiphase spectrum is at least one of an amplitude, a phase, and a frequency.

11. A system for attenuating noise from a fan exhaust of a computer system, comprising:
    an acoustic sensor configured to monitor the noise from the fan exhaust;
    a spectral analyzer configured to calculate a frequency spectrum of the noise from the monitored noise;
    an antiphase spectrum generator configured to generate an antiphase spectrum from the frequency spectrum;
    an air compressor configured to produce a flow of compressed air which is directed into the fan exhaust; and
    a control actuator configured to control the flow of compressed air to exhibit a property of the antiphase spectrum,
    wherein the system is configured to attenuate the noise by using the flow of air to reduce turbulence in the fan exhaust.

12. The system of claim 11, further comprising:
    multiple nozzles arranged circumferentially around the fan exhaust,
    wherein the nozzles are configured to direct the flow of compressed air into the fan exhaust.

13. The system of claim 12, wherein each of the nozzles exhibits a different frequency of the antiphase spectrum.

14. The system of claim 12, wherein the nozzles are used to counteract asymmetrical turbulence patterns in the fan exhaust.

15. The system of claim 12, wherein the control actuator is one of multiple control actuators, and wherein each control actuator is associated with one of the nozzles.

16. The system of claim 11, wherein the frequency spectrum is produced using a Fast Fourier Transform (FFT).

17. The system of claim 11, wherein the antiphase spectrum is generated using a service processor of the computer system.

18. The system of claim 11, wherein the noise is monitored using a microelectromechanical systems (MEMS) acoustic sensor.

19. The system of claim 18, wherein the flow of compressed air is directed into the fan exhaust downstream from the MEMS acoustic sensor.

20. The system of claim 11, wherein the property of the antiphase spectrum is at least one of an amplitude, a phase, and a frequency.

* * * * *